R. L. SHUTE.

Churn.

No. 50,963.

Patented Nov. 14, 1865.

WITNESSES:

INVENTOR.

UNITED STATES PATENT OFFICE.

R. L. SHUTE, OF PHILADELPHIA, PENNSYLVANIA.

IMPROVEMENT IN CHURNS.

Specification forming part of Letters Patent No. 50,963, dated November 14, 1865.

*To all whom it may concern:*

Be it known that I, R. L. SHUTE, of Philadelphia, in the county of Philadelphia and State of Pennsylvania, have invented a new and useful Improvement in Churns; and I do hereby declare that the following is a full, clear, and exact description thereof, which will enable others skilled in the art to make and use the same, reference being had to the accompanying drawings, forming part of this specification, in which—

Figure 2:
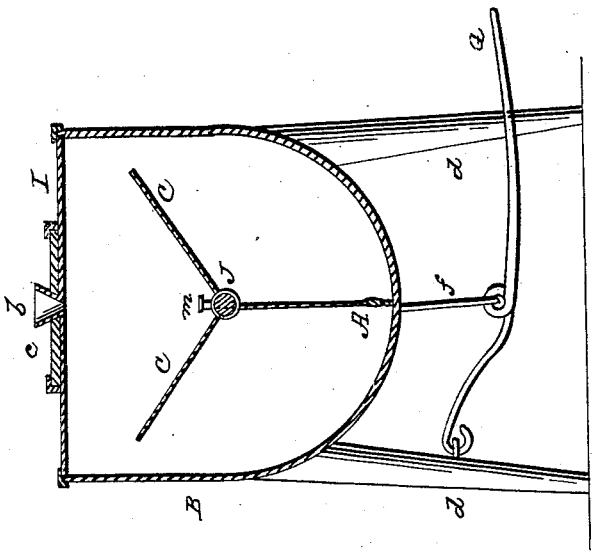
Figure 1:
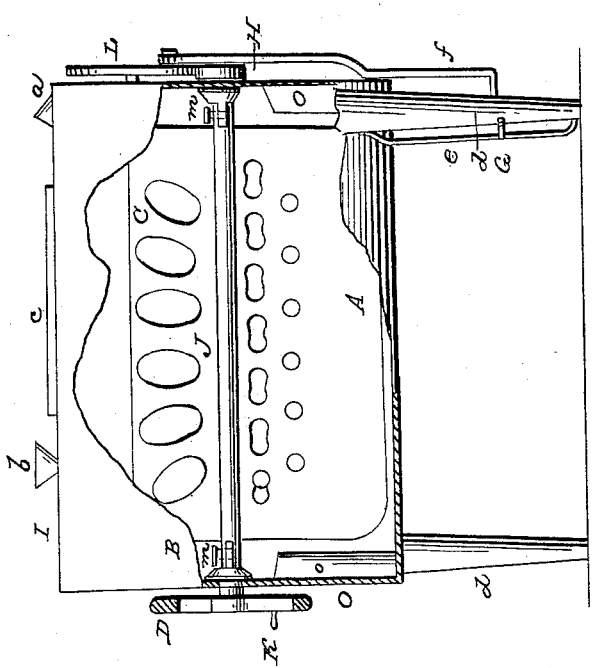

Figure 1 is a side elevation of a churn made according to my invention, a portion of the box being broken away to show the interior. Fig. 3 is an elevation of a transverse section through the funnel *b*.

Similar letters of reference indicate like parts.

This invention consists in an improvement in the class of churns which have rotating beaters on a horizontal shaft, whereby ease of operation and economy of construction are attained in a high degree.

B is the box of the churn, supported on legs *d*, and having a cover, I, which in this example of my invention is made to slide shut along grooves formed in the upper edges of the box. The cover has a glass window, *c*, in it, and a handle, *a*, by means of which the cover is opened and closed, and the usual funnel or vent, *b*.

J is a horizontal shaft extending through the box B and revolving in bearings made in the ends of the box. It carries within the box three radial arms, called "beaters," extending in length nearly from end to end of the box, two of them, C C, being perforated by holes arranged in a series near their edges, as seen in Fig. 1, where one of the beaters C is shown, and the third beater, A, being perforated by holes arranged in a double series near the shaft J and parallel with it.

Breakers O, both of which are seen in Fig. 1, are placed on the sides of the box, one at each end, vertically beneath the shaft J, the breadth of the breakers being such as to permit the unobstructed revolution of the beaters. The beater A is also loaded along its outer edge, as shown in both drawings, by an addition thereto of some metallic or other heavy substance which will not be injurious to the cream or butter.

The shaft J is made in three sections, the middle section being that portion of it which carries the beaters, and which is united to the others by suitable joints, *m*, both of which are shown in Fig. 1, the joints being secured by bolts, plain or threaded. By this means I am enabled to remove the beaters from the box whenever it is desirable to do so.

One of the outer ends of the shaft carries a gear-wheel, H, which is engaged by a gear-wheel, L, to a crank-pin, on the edge of which is secured a pitman, *f*, which is connected by a free joint to a treadle, G, which travels within a vertical guide made by securing a guiding-wire, *e*, to the side of one of the legs *d*. The opposite end of the shaft J carries a balance-wheel, D, to which is fixed a crank-pin or handle, K, by means of which the beaters can be rotated slowly by hand when the operator wishes to gather the butter.

The action of my churn causes the rapid completion of the churning process with great economy of power and simplicity and cheapness of construction.

The rotation of the beaters may be increased or diminished by means of suitable changes of the gear-wheels L and H.

The mode of action of the perforated beaters is to carry part of the contents of the box B up its sides, many return-currents being established therein by means of the perforations which are placed near the edges of the beaters C, because the contents of the box will be carried by centrifugal action toward the outer edges of the beaters. The loaded beater A, however, being solid near its outer edge, causes a reversion in the return-currents, and the cream is forced toward the shaft J and compelled to find a passage to the space behind that beater through the holes made in it near the line of the shaft. The cream which gathers at either end of the box B is subjected to a violent agitation by being dashed against the vertical fixed breakers O.

The object sought by loading the beater A is to secure in the simplest and most economical way means for overcoming the dead-points in the revolution of the shaft J, the crank-pin on the gear-wheel L being placed at a suitable angle with the plane of the loaded beater, so that the latter shall serve the purpose of a balance-wheel.

The balance-wheel D may be wholly dispensed with and a simple crank take its place on that end of the shaft, or it may be made much lighter than usual. By loading the beater A, I also obtain the means within the churn itself of overcoming the gravity of the treadle and pitman without providing a fly-wheel especially therefor.

I claim as new and desire to secure by Letters Patent—

The combination, with the box B of the churn, of the beaters C C, perforated near their outer edges, and the beater A, loaded at its outer edge and perforated near its shaft, the said beaters C C and A being arranged radially upon a horizontal shaft, substantially as above described.

R. L. SHUTE.

Witnesses:
H. FULTON,
F. L. MASON.